United States Patent
Mentink et al.

(10) Patent No.: US 6,832,806 B2
(45) Date of Patent: Dec. 21, 2004

(54) HYDRAULIC ACTUATING DEVICE, IN PARTICULAR FOR A CONVERTIBLE-TOP ASSEMBLY OF A VEHICLE

(75) Inventors: Laurentius Andreas Gerhardus Mentink, Haaksbergen (NL); Johnny Antonius Jacobus Wiggemans, Oldenzaal (NL)

(73) Assignee: Actuant Corporation, Glendale, WI (US)

( * ) Notice: Subject to any disclaimer, the term of this patent is extended or adjusted under 35 U.S.C. 154(b) by 0 days.

(21) Appl. No.: 10/138,951

(22) Filed: May 2, 2002

(65) Prior Publication Data

US 2002/0162446 A1 Nov. 7, 2002

(30) Foreign Application Priority Data

May 3, 2001 (NL) .............................................. 1017987

(51) Int. Cl.$^7$ ................................. B60J 7/00; B60J 7/08
(52) U.S. Cl. ............................. 296/115; 60/424; 91/520
(58) Field of Search ........................... 296/115, 107.01, 296/108, 117, 107.08; 60/424; 91/520

(56) References Cited

U.S. PATENT DOCUMENTS

| | | | | |
|---|---|---|---|---|
| 3,476,016 A | * | 11/1969 | Dixon et al. | |
| 4,266,749 A | * | 5/1981 | Lundstrom | 91/520 |
| 4,394,103 A | * | 7/1983 | Butler et al. | 91/520 |
| 4,423,664 A | * | 1/1984 | Buchl | 91/520 |
| 4,622,886 A | * | 11/1986 | Imada et al. | 91/520 |
| 4,976,336 A | * | 12/1990 | Curran | 91/520 |
| 5,110,251 A | * | 5/1992 | Gray | 91/520 |
| 5,520,443 A | * | 5/1996 | Zanzig | 91/520 |
| 5,666,873 A | * | 9/1997 | Lindmayer et al. | 296/117 |
| 5,724,878 A | * | 3/1998 | Stolle et al. | 296/117 |
| 6,039,382 A | * | 3/2000 | Mater et al. | 296/107.01 |
| 6,149,221 A | * | 11/2000 | Mentink | 296/117 |
| 6,267,432 B1 | * | 7/2001 | Stolle | 296/107.01 |
| 6,397,592 B1 | * | 6/2002 | Baumert et al. | 61/423 |
| 6,508,503 B2 | * | 1/2003 | Mentink | 296/117 |
| 2002/0167194 A1 | * | 11/2002 | Mentink et al. | 296/107.01 |

FOREIGN PATENT DOCUMENTS

| | | |
|---|---|---|
| EP | 0 565 190 A1 | 10/1993 |
| EP | 0 693 390 A1 | 1/1996 |

* cited by examiner

*Primary Examiner*—D. Glenn Dayoan
*Assistant Examiner*—H. Gutman
(74) *Attorney, Agent, or Firm*—Quarles & Brady LLP

(57) ABSTRACT

The present invention relates to a hydraulic actuating device for a device having a first and a second hydraulically moveable component. This actuating device comprises a first and a second hydraulic actuator, respectively, for moving the first and second moveable components. The first and second actuators each have a housing in which there is a space in which a piston and piston rod assembly can move in a reciprocating manner, with a piston and a piston rod which is coupled to the piston and projects out of the housing. The piston delimits a first working chamber and a second working chamber in the housing. The housing is provided with a first and a second connection, which are respectively in communication with the first and second working chambers in order to supply and discharge hydraulic fluid in order to displace the piston and piston rod assembly. The actuating device further comprises a connecting line which forms an open connection between the second working chamber of the first actuator and the first working chamber of the second actuator. The actuating device also comprises a pump having a delivery port and a suction port of the pump being connected to the reservoir, and valve means, having one or more actuable valves. The hydraulic actuating device is useful in controlling convertible tops of automobiles.

13 Claims, 5 Drawing Sheets

HYDRAULIC ACTUATING DEVICE, IN PARTICULAR FOR A CONVERTIBLE-TOP ASSEMBLY OF A VEHICLE

FIELD OF THE INVENTION

The present invention relates to a hydraulic actuating device for a device having a first and a second hydraulically moveable component. This actuating device comprises a first and a second hydraulic actuator, respectively for moving the first and second moveable components. The first and second actuators each have a housing in which there is a space in which a piston/piston rod assembly can move in a reciprocating manner, with a piston and a piston rod which is coupled to the piston and projects out of the housing, the piston delimiting a first working chamber and a second working chamber in the housing. The housing is provided with a first and a second connection, which are respectively in communication with the first and second working chambers in order to supply and discharge hydraulic fluid in order to displace the piston/piston rod assembly. The actuating device further comprises a connecting line which forms an open connection between the second working chamber of the first actuator and the first working chamber of the second actuator. The actuating device also comprises a pump having a delivery port and a suction port, a reservoir for hydraulic fluid, the suction port of the pump being connected to the reservoir, and valve means, having one or more actuable valves.

In practice, it is often the case that a mechanical device has a plurality of moveable components which are each coupled to an associated hydraulic actuator in order to drive the component in question. The movement of each component often forms part of a sequence of movements of the device, i.e. a combination of successive and/or (partially) simultaneous movements of the components of the device.

FIG. 1 of the present application shows a vehicle having a generally known design, which is shown by way of example, of a hydraulically actuable convertible-top assembly. This convertible-top assembly comprises a plurality of moveable components, which are each moved by an associated hydraulic actuator or by a pair of actuators connected in parallel on either side of the body. By way of example, a pair of main bow actuators, a pair of rear bow actuators, a pair of actuators for the tonneau cover, and optionally hydraulic actuators of the locking means for the convertible top and/or the tonneau cover are provided. A convertible-top assembly of this type undergoes an "opening movement sequence", during which the convertible top is opened, and a "closing movement sequence", in which the convertible top is closed.

There is a commercial demand for the sequences of movements of a convertible-top assembly of this type to be carried out quickly, with time savings of a few seconds being deemed relevant. There is also a desire for the sequences of movements to be graceful and for the movements of the components, in particular of the convertible top and the tonneau cover, to proceed smoothly.

In a known embodiment of the hydraulic actuating device belonging to the convertible-top assembly, there is provision for all the movements of the components to take place sequentially, so that a movement of one component is entirely completed before another component is set in motion. This has the advantage that simple limit-position switches can be used in order to detect that a limit position of an actuator has been reached. Furthermore, this avoids any possible conflict between movements which coincide, for example the possibility of the tonneau cover not having opened sufficiently to allow the convertible top past. However, a drawback is that a sequence of movements takes a considerable time and also looks jerky.

It is known from the prior art in the field of actuable convertible-top assemblies to solve the problem described above by using electromechanical actuators for the components instead of hydraulic actuators. In this case, position sensors are provided, which detect the position of the actuators and/or the components of the convertible-top assembly which are coupled thereto over the entire movement path (or a part thereof). It is then possible, for example, for the position of the tonneau cover to be continuously detected during a sequence of movements and for the movement of the convertible top to be made to partially coincide with the movement of the tonneau cover. However, electromechanical actuators of this type with associated position sensors and control electronics are expensive and susceptible to faults.

It is an object of the present invention to propose an alternative hydraulic actuating device.

SUMMARY OF THE INVENTION

The invention achieves this object by providing a hydraulic actuating device for a device having a first and a second hydraulically moveable component as abovedescribed wherein the valve means are designed to optionally: connect the first connection of the first actuator to the reservoir, or connect the delivery port of the pump to the first connection of the first actuator, wherein the valve means are also designed to optionally: connect the second connection of the second actuator to the reservoir, or connect the delivery port of the pump to the second connection of the second actuator, and wherein the valve means are also designed to optionally: connect the connecting line to the reservoir, or connect the delivery port of the pump to the connecting line, or make the connecting line with the connected second chamber of the first actuator and the first chamber of the second actuator into a closed volume.

This actuating device makes it possible to make the connecting line with the connected second chamber of the first actuator and the first chamber of the second actuator into a closed volume, resulting in a state in which the first and second actuators are connected in series. In this state, the first and second actuators move synchronously, with a fixed ratio between the speeds of movement, the fixed ratio being determined by the dimensioning of the actuators.

The actuating device also allows the first and second actuators to be driven independently of one another, so that, in an advantageous embodiment, it is possible, for example, for the first actuator to be in operation throughout the sequence of movements, then for the first and second actuators to be connected in series and therefore move synchronously, and then finally for the second actuator to continue its movement while the first actuator is retained in a limit position.

In particular, the invention provides for an actuating device of this type to be used to drive various components of a convertible-top assembly of a motor vehicle. By way of example, the first actuator moves the main bow of the convertible top and the second actuator moves the tonneau cover. In another example, for what is known as a retractable hard top, the first actuator moves a first panel and the second actuator moves a second panel of the hard top.

It will be clear to the person skilled in the art that the hydraulic actuating device is also suitable for other applications.

Furthermore, it will be clear to the person skilled in the art that the inventive idea can also be applied to more than two actuators.

The inventive idea and an advantageous embodiment of the hydraulic actuating device according to the invention are described in the following description with reference to the drawings.

DETAILED DESCRIPTION OF THE INVENTION

Figure 1:
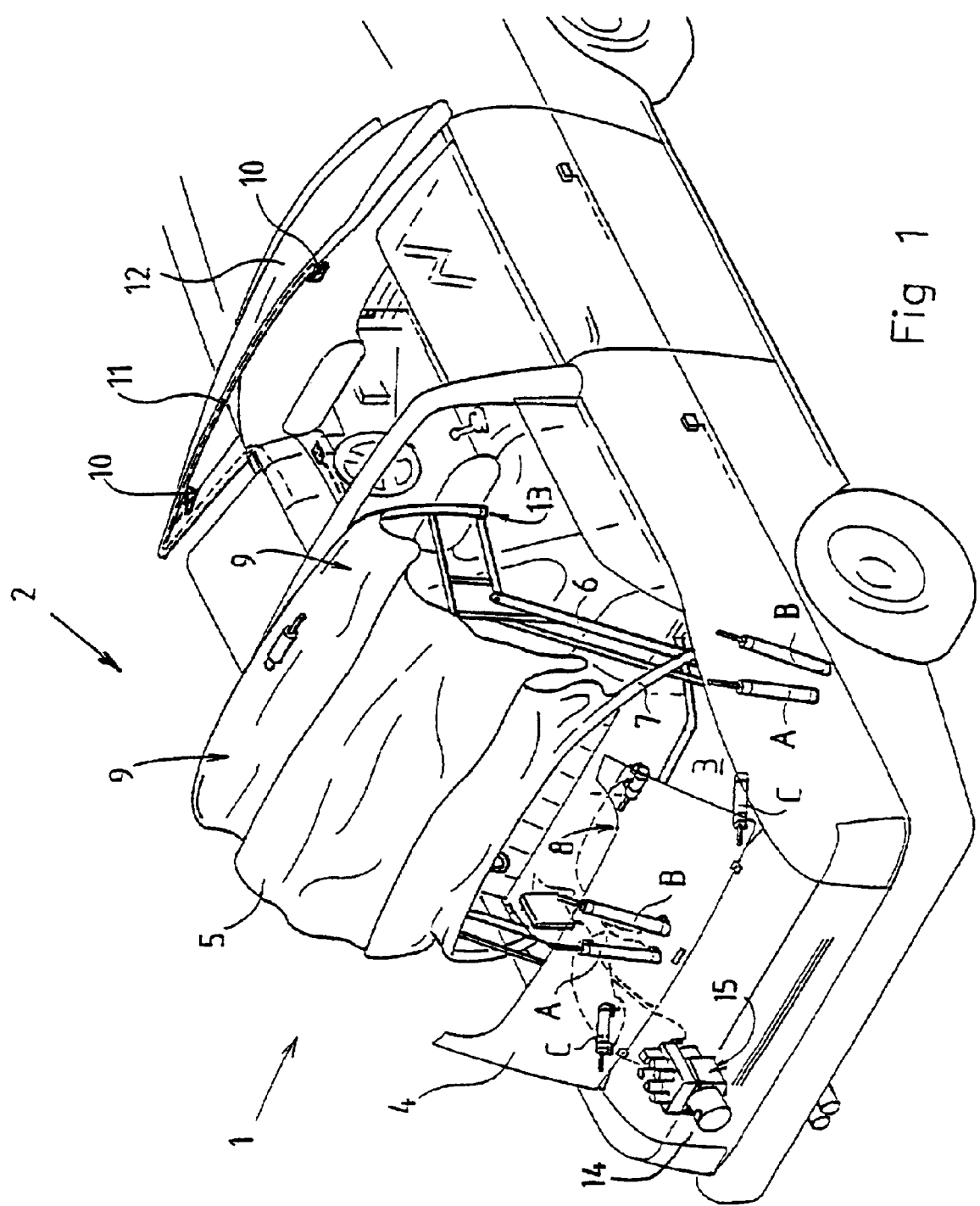
FIG. 1 shows a perspective view of a vehicle of the cabriolet type, with the convertible top partly open and the hydraulic actuators of the actuating device indicated diagrammatically.

FIG. 1 shows, by way of example, a vehicle 1 of the cabriolet type, having a body and passenger compartment 2 therein. The vehicle 1 has a convertible-top assembly having a foldable convertible top for covering the passenger compartment 2 and a hydraulic actuating device for moving the convertible top between a closed position, in which the convertible top covers the passenger compartment 2 of the vehicle 1, and an open position, in which the passenger compartment 2 is not covered.

Behind the passenger compartment 2, the body of the vehicle 1 has a compartment 3 for accommodating the convertible top in the open position, and also a tonneau cover 4, which can pivot up and down, for closing the compartment 3.

The convertible top has a foldable covering 5 and a framework which can be folded up for the covering 5. The framework comprises, inter alia, a main bow 6 which can be moved by the actuating device between a pivoted-up and a pivoted-down position, and a pivotable rear bow 7 for moving the rearmost section of the covering 5 of the folding roof. The rear bow 7 can be moved by the actuating device between a pivoted-up position, in which the rear bow 7 lies more or less adjacent to the pivoted-up main bow 6, as shown in FIG. 1, and a pivoted-down position.

A mechanical lock (not shown) is provided at 8 for the purpose of locking the tonneau cover 4 in the position in which it closes off the compartment 3.

To lock the convertible top in the closed position, two locks, which can interact with locking recesses 10 in bar 11 above the front windscreen 12 of the vehicle 1, are provided at the front edge of the convertible top, at 9, in order to lock the convertible top in the closed position.

The convertible top illustrated is of a known type, of which that part of the folding roof which adjoins the front edge of the convertible top can pivot upwards about pivot line 13 with respect to that part of the convertible top which lies below it. This pivoting of the front part is effected by mechanical coupling between the said front part and the rear part of the convertible top, which is moved by the rear bow 7.

Figure 5:
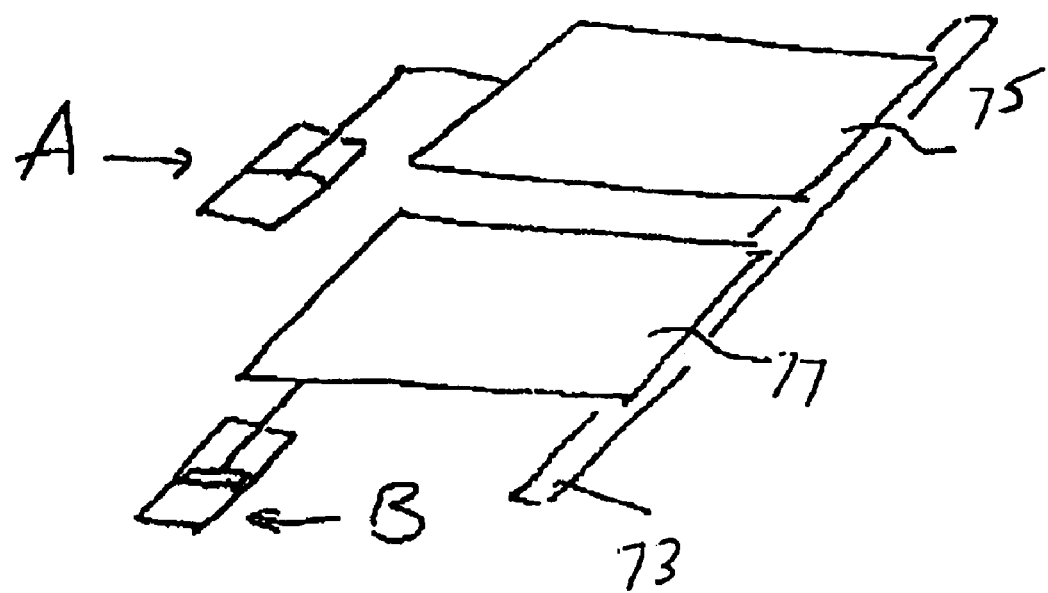
FIG. 5 shows a retractable hard top.

Referring now to FIG. 5, a second type of convertible top is shown. Here the convertible top is a retractable hard top including a support structure 73 bearing a first rigid panel 75 and a second rigid panel 77. The first rigid panel 75 and second rigid panel are moveable with respect to one another.

The hydraulic actuating device comprises a plurality of hydraulic actuators, including a pair of main bow actuators A for pivoting the main bow 6, a pair of rear bow actuators B for pivoting the rear bow 7 and a pair of actuators C for moving the tonneau cover 4.

The hydraulic actuating device also comprises a reservoir 14 for hydraulic fluid and a pump 15.

Figure 2:
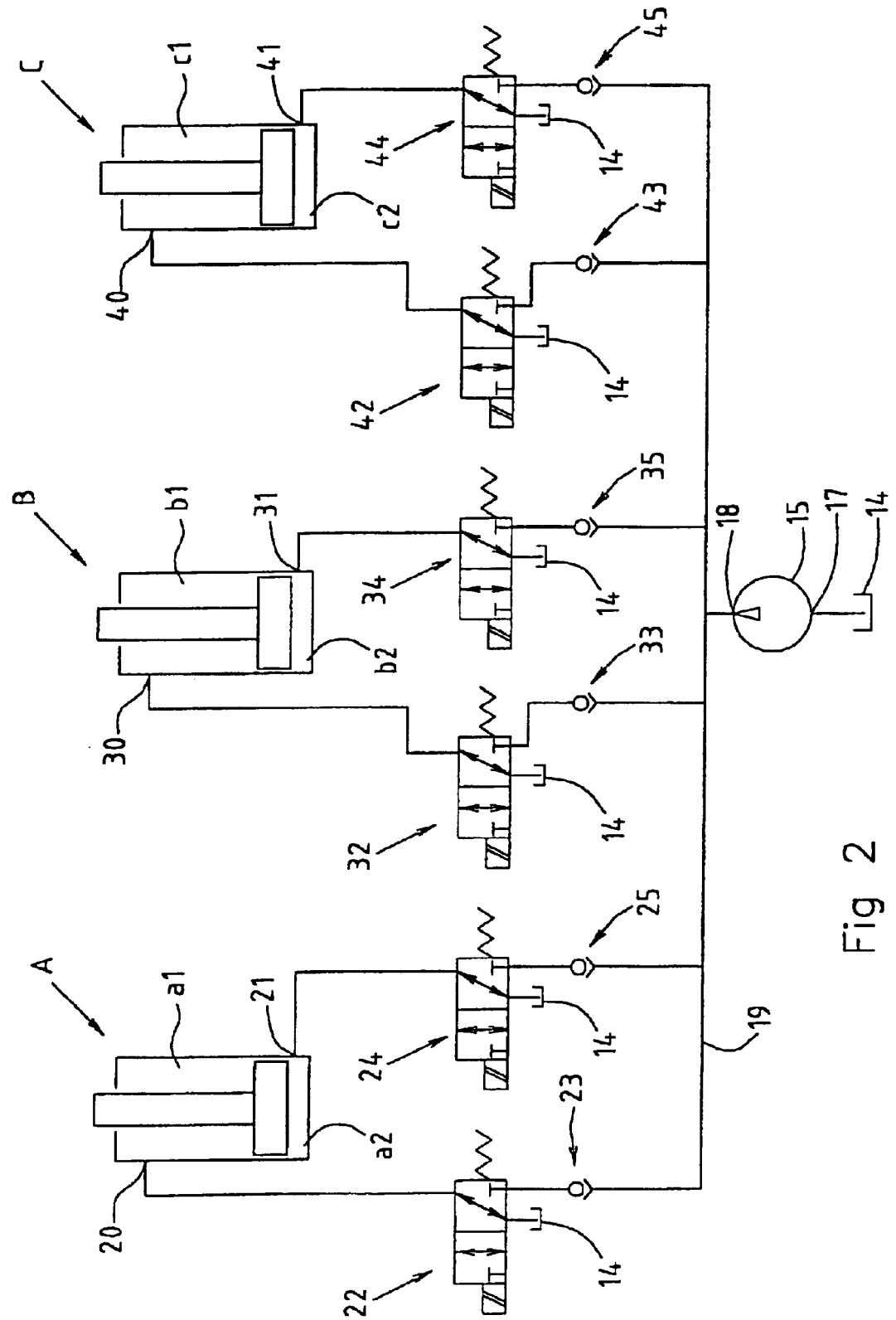
FIG. 2 shows a hydraulic circuit diagram of a generally known embodiment of a hydraulic actuating device for a convertible-top assembly.

FIG. 2 shows a hydraulic actuating device, which is known from the prior art, for a convertible-top assembly of a vehicle, including the actuators which have already been shown in FIG. 1, namely a pair of main bow actuators A for pivoting the main bow 6, a pair of rear bow actuators B for pivoting the rear bow 7 and a pair of actuators C for moving the tonneau cover 4. The actuators of each pair are connected in parallel in a known way, so that, for the sake of simplicity in each case only one actuator of each pair is shown in FIG. 2 and referred to in the remainder of the description.

The main bow actuators A, the rear bow actuators B and the actuators C are linear piston/cylinder devices, each having a first working chamber and a second working chamber, which are separated from one another by a piston of the relevant actuator and are respectively denoted by a1,a2, b1,b2, c1,c2.

The pump 15 has a suction port 17 and a delivery port 18 and has a single pumping direction, i.e. the pump 15 can only pump fluid from the suction port 17 to the delivery port 18. The suction port 17 is connected to the reservoir 14. Furthermore, the pump 15 is designed in such a manner that there can be no flow through the pump 15 from the delivery port 18 to the suction port 14 and therefore to the reservoir 14. This may, for example, be a radial plunger pump. The pump 15 is preferably driven by an electric motor (not shown).

The delivery port 18 of the pump 15 is connected to a common line 19, which line 19 is connected to each of the actuators A, B and C.

The actuator A has a connection 20 which belongs to the chamber a1 and a connection 21 which belongs to the chamber a2.

The actuator B has a connection 30 which belongs to the chamber b1 and a connection 31 which belongs to the chamber b2.

In FIG. 2, between each of the connections of an actuator and the line 19 there is a line which accommodates, between the connection and the line 19, an actuable two-position valve 22, 24, 32, 34, 42, or 44, which in a first position connects the working chamber to the reservoir 14 and in a second position connects the working chamber to the line 19, and also a nonreturn valve which closes in the direction of line 19. The valve is an electromagnetically actuated 3/2 ball seat valve with spring return to the first position.

The operation of the device which is shown in FIG. 2 is generally known and has already been explained in part above. In particular, it should be noted that the nonreturn valves 23, 25, 33, 35, 43, 45 are provided to allow the actuators A, B, C to be hydraulically held in place in both directions of the piston rod if the sequence of movements of the cap assembly is interrupted. In that case, all two-position valves are activated while the pump 15 is switched off. If, for a certain actuator, the holding function is not required in one or both directions of the piston rod, the associated nonreturn valve can be dispensed with.

In the actuating device shown in FIG. 2, the movements of the actuators A, B and C are carried out sequentially, with a limit-position switch usually being provided at each actuator in order to detect that the limit position has been reached.

Figure 3:
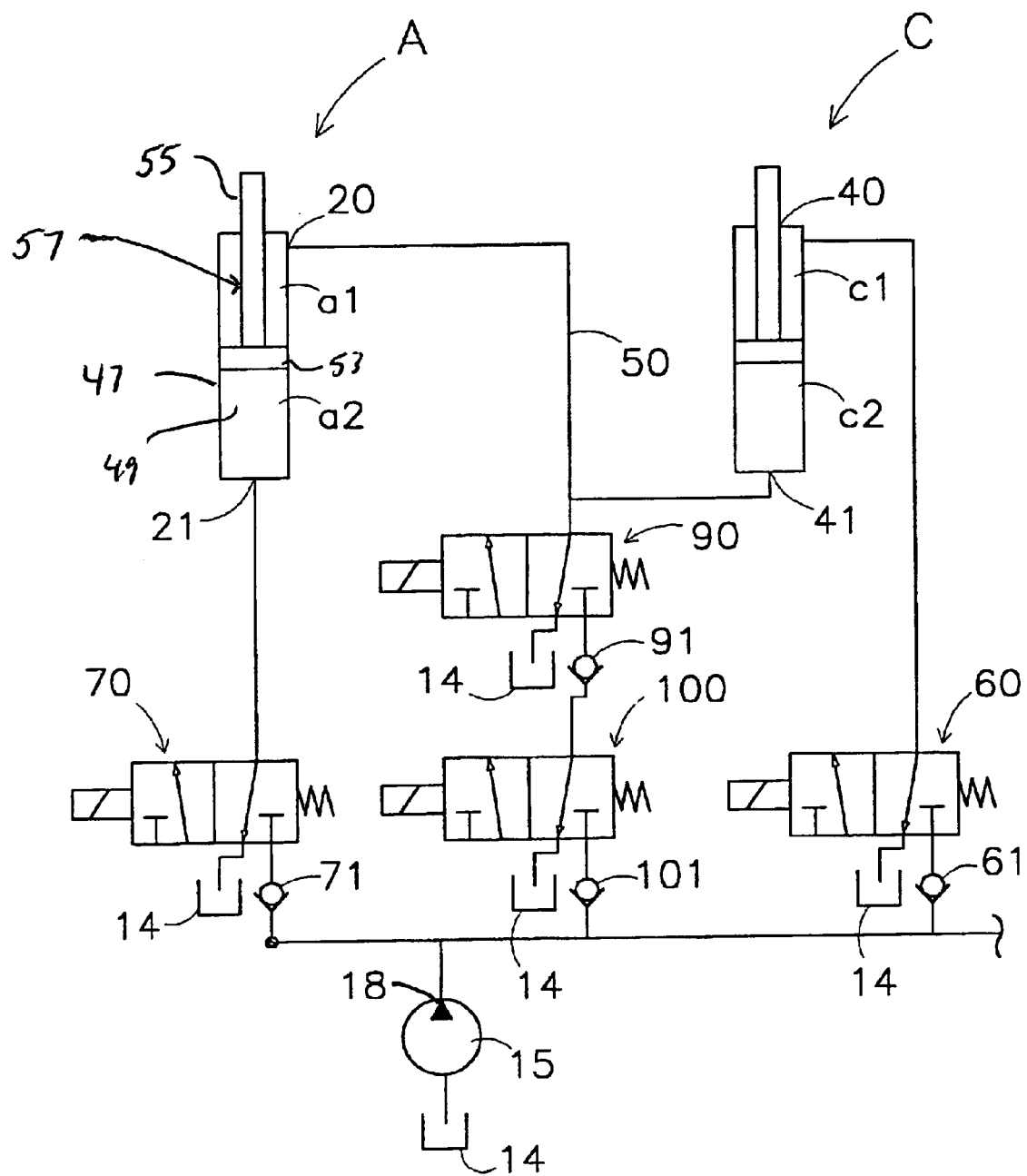
FIG. 3 shows a hydraulic circuit diagram for a preferred embodiment of the hydraulic actuating device according to the invention.

FIG. 3 shows a hydraulic circuit diagram of a preferred embodiment of the actuating device according to the invention. To explain the inventive idea, it is envisaged that this circuit diagram forms an alternative to the circuit diagram shown in FIG. 2 at least with regard to the main bow actuator A and the tonneau-cover actuator C. The rear bow actuator B remains connected in the same way as that shown in FIG. 2.

The main bow actuator A and the tonneau cover actuator C can be seen in the circuit diagram shown in FIG. 3.

These actuators A and C, like the actuator B, each have a housing 47 in which there is a space 49 in which a piston and piston rod assembly 57 can move in a reciprocating manner, having a piston 53 and a piston rod 55 which is coupled to the piston 55 and projects out of the housing 42.

In the housing, the piston in each case delimits a first working chamber a1, c1 and a second working chamber a2, c2. The housing of the actuator C is provided with a first connection 40 and a second connection 41, which are respectively in communication with the first and second working chambers c1, c2 for supplying and discharging hydraulic fluid in order to displace the piston/piston rod assembly.

The housing of the actuator A is provided with a first connection 20 and a second connection 21, which are respectively in communication with the first and second working chambers a1, a2 for supplying and discharging hydraulic fluid in order to displace the piston/piston rod assembly.

A connecting line 50 forms an open connection between the second working chamber c2 of the actuator C and the first working chamber a1 of the actuator A.

Flexible hoses are preferably connected to the connections of the actuators A and C, and these hoses are connected at the other end to associated connections of a valve block. In this case, the open connecting line 50 is preferably created by a connecting passage in the valve block between the connections for the hoses leading to the connections 20 and 41.

An actuable two-position valve 60 is provided at the first connection 40 of the actuator C. Furthermore, a nonreturn valve 61 is provided and is preferably integrated in the valve 60.

The valve 60 is an electromagnetic, spring-return 3/2 valve, which is a widely used valve, which is therefore available at an attractive cost.

The valve 60 makes it possible to optionally:
connect the first connection 40 of the actuator C to the reservoir 14 (valve 60 unenergized), or
connect the delivery port 18 of the pump 15 to the first connection 40 of the actuator C (valve 60 energized).

If the valve 60 is energized, the nonreturn valve 61 prevents fluid from flowing out of the corresponding first chamber c1.

An actuable two-position valve 70 is provided at the second connection 21 of the actuator A. Furthermore, a nonreturn valve 71 is provided and is preferably integrated in the valve 70. The valve 70 is also an electromagnetic, spring-return 3/2 valve.

The valve 70 makes it possible to optionally:
connect the second connection 21 of the actuator A to the reservoir 14 (valve 70 unenergized), or
connect the delivery port 18 of the pump 15 to the second connection 21 of the actuator A (valve 70 energized).

If the valve 70 is energized, the nonreturn valve 71 prevents fluid from flowing out of the corresponding second chamber a2.

The connecting line 50 is assigned two actuable two-position valves 90, 100, which are positioned in series. The valves 90, 100 are electromagnetic, spring-return 3/2 valves.

In a first position (unenergized), the valve 90 connects the connecting line 50 to the reservoir 14, and in a second position (energized), the valve 90 forms a connection between the valve 100 and the connecting line 50.

In a first position (unenergized), the valve 100 connects the valve 90 to the reservoir 14, and in a second position (energized), the valve 100 connects the delivery port of the pump 15 to the third valve 90.

A nonreturn valve 91 is arranged between the two-position valve 90 and the two-position valve 100. As has been stated, this nonreturn valve 91 is preferably integrated in the two-position valve 90. This integration is also the reason for the presence of the nonreturn valve 101 which is arranged between the valve 100 and the line 19. This nonreturn valve 101 is actually superfluous, but in practice it is advantageous for the valves 90 and 100 to be of identical design, in each case having an integral nonreturn valve 91, 101.

If the valve 90 is unenergized, the connecting line 50 is in communication with the reservoir 14.

If the valves 90 and 100 are both energized, fluid can flow under pressure from the delivery port 18 of the pump 15 to the connecting line 50.

If the valve 90 is energized and the valve 100 is unenergized, the position is reached in which the connecting line 50 with the connected second chamber c2 of the actuator C and the first chamber a1 of the actuator A are made into a closed volume. These chambers c2, a1 are therefore then connected in series.

If, in this position, fluid is then supplied to the chamber c1 via the energized valve 60, and valve 70 is unenergized, fluid will be displaced out of the chamber c2 and will pass into the chamber a1. As a result, the retracting movements of piston rods of the actuators A and C are synchronous, i.e. the speeds are at a fixed ratio. It will be clear that if the valve 60 is unenergized and the valve 70 is energized, a synchronous extending movement of the actuators A and C is achieved.

It will be clear to the person skilled in the art that the actuating device shown in FIG. 3 makes it possible for the movements of the tonneau cover and the convertible top to partially coincide during the sequence of movements involved in opening and/or closing the convertible top. The movements take place synchronously, i.e. with a fixed ratio of the speeds of movement with respect to one another, during the period of coincidence. Obviously, it is also possible for each of the actuators A and C to be moved separately.

The synchronization of the movements of the actuators A and C cannot be disrupted, with the result that the control means for the convertible-top assembly can be of simple design. In practice, it will be possible to make do with fitting limit-position switches for each actuator, so that there is no need for position sensors which detect the actual movement of the convertible top and/or the tonneau cover over a distance.

Depending on the design of the pump, during the period in which the movements coincide, the speed of the actuators A and C may deviate from the speed of the corresponding actuators A and C when only the actuator A or the actuator C is operating.

Figure 4:
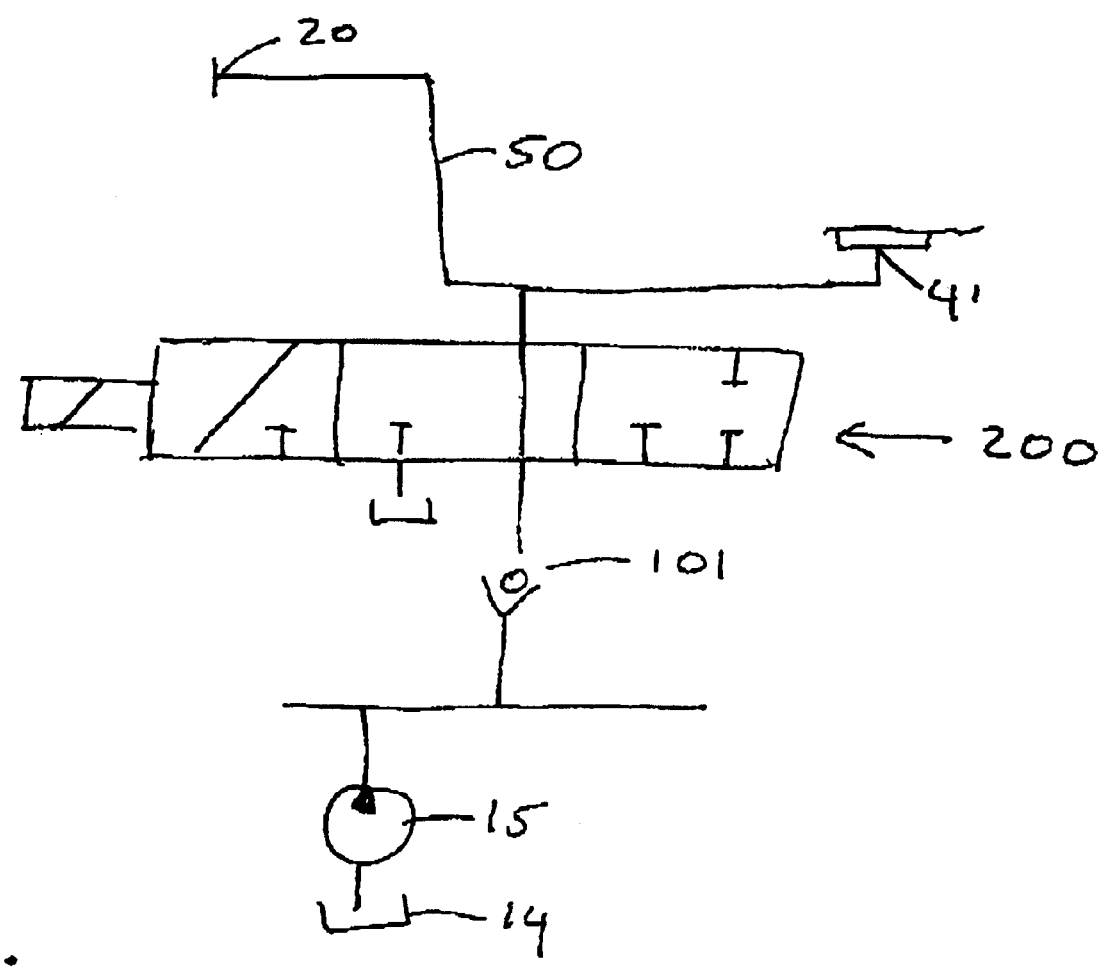
FIG. 4 shows a hydraulic circuit diagram for an alternate embodiment of the hydraulic actuating device according to the invention.

Referring now to FIG. 4, a variant is shown in which there is provision for the valves 90 and 100 to be replaced by an actuable three-position valve 200 which belongs to the connecting line and in a first position connects the connecting line 50 to the reservoir 14, in a second position connects the delivery port of the pump to the connecting line 50 and in a third position makes the connecting line 50 together with the connected second chamber c2 of the actuator C and the first chamber a1 of the actuator A into a closed volume.

It will be clear to the person skilled in the art that the inventive idea can also be implemented with more than two hydraulic actuators.

What is claimed is:

1. Hydraulic actuating device for a device having a first and a second hydraulically moveable component, wherein said hydraulic actuating device comprises:

a first and a second hydraulic actuator, respectively for moving the first and second moveable components, the first and second actuators each having a housing in which there is a space in which a piston and piston rod assembly can move in a reciprocating manner, with a piston and a piston rod which is coupled to the piston and projects out of the housing, the piston delimiting a first working chamber and a second working chamber in the housing, and the housing being provided with a first and a second connection, which are respectively in communication with the first and second working chambers in order to supply and discharge a hydraulic fluid in order to displace the piston and piston rod assembly, a connecting line which forms an open connection between the second working chamber of the first actuator and the first working chamber of the second actuator, a pump having a delivery port and a suction port, a reservoir for the hydraulic fluid, the suction port of the pump being connected to the reservoir, a valve assembly, wherein the valve assembly selectively:
connects the first connection of the first actuator to the reservoir, or to the delivery port of the pump; and wherein the valve assembly selectively:
connects the second connection of the second actuator to the reservoir, or to the delivery port of the pump, independent of the connection of the first connection of the first actuator to the reservoir or to the delivery port of the pump; and wherein the valve assembly selectively:
connects the connecting line to the reservoir, or connect the connecting line to the delivery port of the pump, or makes the connecting line, the second chamber of the first actuator and the first chamber of the second actuator a closed volume, independent of the connection of the first connection of the first actuator to the reservoir or to the delivery port of the pump and independent of the second connection of the second actuator to the reservoir or to the delivery port of the pump.

2. The hydraulic actuating device according to claim 1, in which the valve assembly comprises a first actuable two-position valve, which belongs to the first connection of the first actuator, and a second actuable two-position valve, which belongs to the second connection of the second actuator.

3. The hydraulic actuating device according to claim 1, in which the valve assembly comprises an actuable three-position valve which belongs to the connecting line and, in a first position, connects the connecting line to the reservoir, in a second position connects the delivery port of the pump to the connecting line, and in a third position makes the connecting line with the second working chamber of the first actuator and the first working chamber of the second actuator into a closed volume.

4. The hydraulic actuating device according to claim 1, in which the valve assembly comprises a third actuable two-position valve, which belongs to the connecting line, and a fourth actuable two-position valve, which is connected in series with the third actuable two-position valve, the third valve in a first position connecting the connecting line to the reservoir and in a second position forming a connection between the fourth valve and the connecting line, and the fourth valve in a first position connecting the third valve to the reservoir and in a second position connecting the delivery port of the pump to the third valve.

5. The hydraulic actuating device according to claim 1, in which the valve assembly comprises a first nonreturn valve which, when there is a connection between the delivery port of the pump and the first working chamber of the first actuator, prevents said hydraulic fluid from flowing out of the corresponding first working chamber.

6. The hydraulic actuating device according to claim 1, in which the valve assembly comprises a second nonreturn valve which, when there is a connection between the delivery port of the pump and the second chamber of the second actuator, prevents said hydraulic fluid from flowing out of the corresponding second chamber.

7. The hydraulic actuating device according to claim 1, in which the valve assembly comprise a third nonreturn valve which, when there is a connection between the delivery port of the pump and the connecting line, prevents said hydraulic fluid from flowing out of the connecting line to the delivery port.

8. The hydraulic actuating device, according to claim 1, in which the valve assembly comprises a third actuable two-position valve, which belongs to the connecting line, and a fourth actuable two-position valve, which is connected in series with the third actuable two-position valve, the third valve in a first position connecting the connecting line to the reservoir and in a second position forming a connection between the fourth valve and the connecting line, and the fourth valve in a first position connecting the third valve to the reservoir and in a second position connecting the delivery port of the pump to the third valve, and in which the valve assembly comprises a third nonreturn valve which, when there is a connection between the delivery port of the pump and the connecting line, prevents said hydraulic fluid from flowing out of the connecting line to the delivery port, and in which the third nonreturn valve is arranged between the third two-position valve and the fourth two-position valve, and in which a fourth nonreturn valve is positioned between the fourth valve and the delivery port of the pump.

9. A convertible-top assembly for a vehicle in which a hydraulic actuating device according to claim 1 is provided for the purpose of moving the first and second hydraulically moveable components.

10. The convertible-top assembly according to claim 9, comprising a main bow, which can pivot up and down with respect to the vehicle body and bears a convertible top, the first hydraulically moveable component driving the main bow, and also comprising a tonneau cover for covering a compartment of the vehicle in which the convertible top is accommodated in an open state, the second hydraulically moveable component moving the tonneau cover.

11. The convertible-top assembly according to claim 9, comprising a main bow, which can pivot up and down with respect to a vehicle body, and also a rear bow or material-tensioning bow, which can pivot up and down for the purpose of moving a part of the convertible-top assembly which lies behind the main bow, the first actuator driving the main bow and the second actuator driving the rear or material-tensioning bow.

12. The convertible-top assembly according to claim 9, in which the convertible top assembly is of the retractable hard-top type, comprising a support structure, which bears a first rigid panel and which bears a second rigid panel, the first and second rigid panels being moveable with respect to one another and the first hydraulically moveable component driving the first panel and the second hydraulically moveable component driving the second panel.

13. A vehicle provided with a convertible-top assembly in which a hydraulic actuating device according to claim 1 is provided for the purpose of moving the first and second hydraulically moveable component.

* * * * *